UNITED STATES PATENT OFFICE.

CHARLES F. HABEDANK, OF JERSEY CITY, NEW JERSEY.

COMPOSITION FOR FORMING LITHOGRAPHIC TRANSFERS.

SPECIFICATION forming part of Letters Patent No. 502,964, dated August 8, 1893.

Application filed March 13, 1893. Serial No. 465,758. (No specimens.)

*To all whom it may concern:*

Be it known that I, CHARLES F. HABEDANK, of Jersey City, Hudson county, New Jersey, have invented an Improved Composition for Forming Lithographic Transfers, of which the following is a specification.

The object of this invention is to produce a lithographic transfer which is of equal intensity as the original and not as heretofore of increased intensity.

The invention also enables me to form a perfect transfer on stones which are yellow and of second quality.

In carrying out my invention I proceed as follows: The polished transfer stone is placed into a hand press and the design formed in transfer ink upon prepared paper is placed upon it and transferred to the stone by pressure, as usual. The paper is then dissolved by water and the stone is washed with clear water and fanned dry. Next I cover the stone with a peculiar composition which is composed of the following ingredients: two pounds water, one pound partly neutralized nitric acid, one ounce tannic acid. This mixture is applied by a sponge so as to uniformly cover the surface, as in gumming. After one or two minutes, during which the composition has been absorbed and etched the stone, it is washed off with water. The stone is then gummed, dried and then the gum is washed off and the stone is washed clean with turpentine and water, as usual. Next the stone is rubbed to reproduce the design, the color is applied by rolls, and the stone is powdered with colophonium and etched as usual, when it is ready for printing.

The peculiar property of my improved composition is that it will etch the body of the stone only, without effecting the fatty particles of the transfer ink and thus the transfer will be of the same intensity as the original.

The partly neutralized nitric acid used in the above composition is obtained as follows: to the commercial nitric acid are added small pieces of crushed lithographic stone. The mixture is allowed to stand until effervescence ceases, when the clear liquid is decanted. This liquid will be partially neutralized nitric acid, *i. e.* nitric acid which will be less violent in its action.

The etching effect of the partially neutralized nitric acid upon the lithographic stone, being less violent than that of the diluted acid, tends to produce a smoother surface and enables the operator to obtain sharper edges of the heavier lines and retain the original sharpness of fine lines without producing rough edges. The action is more uniform over the entire surface of the stone where exposed to the acid, and soft spots, which occur even in the best stones, are not so much affected.

The tannic acid entering into and being retained by the pores of the stone at all places where the same is exposed, *i. e.*, not protected by the lines of the design, even after subsequent washings, increases the non-adhesive action of those parts toward the printing ink.

What I claim is—

1. A composition to be applied to lithographic transfer stones, which consists of water, partly neutralized nitric acid and tannic acid, substantially as specified.

2. A step in the process of making lithographic transfers, which consists in applying the design with transfer ink to the stone and then covering the stone with a composition of water, partly neutralized nitric acid and tannic acid, substantially as specified.

CHARLES F. HABEDANK.

Witnesses:
F. V. BRIESEN,
A. JONGHMANS.